US012397704B1

(12) United States Patent
Engel

(10) Patent No.: US 12,397,704 B1
(45) Date of Patent: Aug. 26, 2025

(54) METHOD FOR AUTOMATICALLY ACTUATING A DIRECTION INDICATOR AND VEHICLE

(71) Applicant: MERCEDES-BENZ GROUP AG, Stuttgart (DE)

(72) Inventor: Michael Engel, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/880,881

(22) PCT Filed: Jun. 21, 2023

(86) PCT No.: PCT/EP2023/066885
§ 371 (c)(1),
(2) Date: Jan. 3, 2025

(87) PCT Pub. No.: WO2024/008459
PCT Pub. Date: Jan. 11, 2024

(30) Foreign Application Priority Data

Jul. 5, 2022 (DE) ...................... 10 2022 002 451.9

(51) Int. Cl.
*B60Q 1/34* (2006.01)
(52) U.S. Cl.
CPC ................... *B60Q 1/346* (2013.01)
(58) Field of Classification Search
CPC .......... B60Q 1/346; B60Q 1/26; B60Q 1/381; B60Q 1/46; B60Q 5/005; B60W 2552/05;
(Continued)

(56) References Cited

U.S. PATENT DOCUMENTS 7,889,065 B2 * 2/2011 Smith ...................... B60Q 1/34
340/475
8,498,778 B2 * 7/2013 Seymour ................ B60Q 1/346
414/400
(Continued)

FOREIGN PATENT DOCUMENTS

DE 19722186 A1 12/1998
DE 10251357 A1 5/2004
(Continued)

OTHER PUBLICATIONS

International Search Report and Written Opinion mailed Sep. 19, 2023 in related/corresponding International Application No. PCT/EP2023/066885.
(Continued)

*Primary Examiner* — Eric Blount
(74) *Attorney, Agent, or Firm* — PATENT PORTFOLIO BUILDERS PLLC

(57) ABSTRACT

A direction indicator of an ego vehicle is automatically actuated depending on information sensor data and a comparison the ego vehicle's location with a digital road map. When the ego vehicle is located on a priority path, sensor data is checked to establish whether, in the event of a priority road that turns, a third-party vehicle can be detected in a street leading into the crossroads from the left, right, or ahead from the perspective of the ego vehicle. The direction indicator is actuated to, depending on the type of the priority road that turns and a detected third-party vehicle activate the direction indicator when the computing unit detects no third-party vehicle in the respective street or prevent activation of the direction indicator when the computing unit detects at least one third-party vehicle in the respective street.

5 Claims, 2 Drawing Sheets

Figure 1:
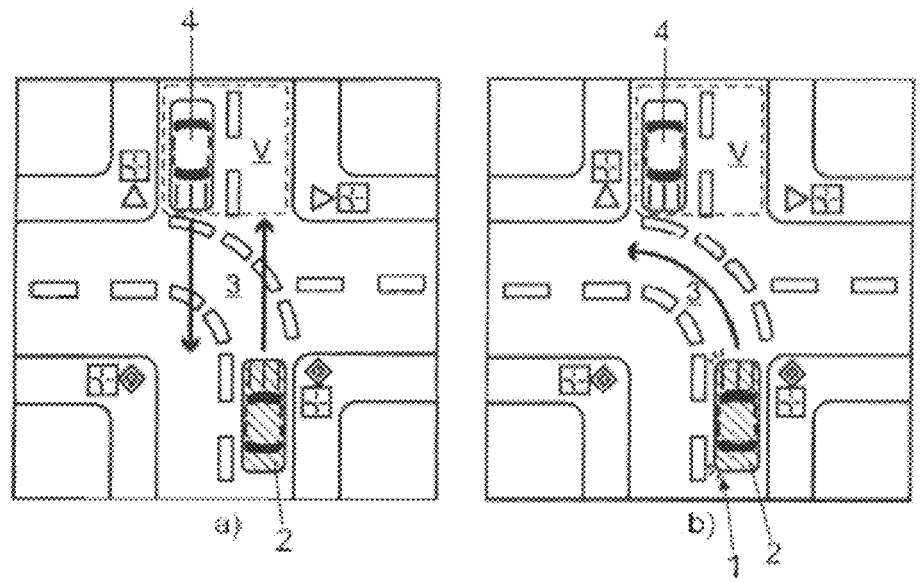

(58) Field of Classification Search
CPC ............ B60W 30/0956; B60W 30/095; G06V 20/588; B60R 2300/102; B60R 2300/804
USPC .......................................................... 340/465
See application file for complete search history.

(56) References Cited

U.S. PATENT DOCUMENTS

| | | | | |
|---|---|---|---|---|
| 9,487,129 | B2* | 11/2016 | Peterson | B60Q 1/346 |
| 9,517,719 | B2* | 12/2016 | Lueke | B60Q 1/346 |
| 9,573,515 | B2* | 2/2017 | Zagorski | B60Q 1/40 |
| 9,783,201 | B2* | 10/2017 | Heinrich | G08G 1/167 |
| 10,406,972 | B2* | 9/2019 | Haight | G01S 13/862 |
| 10,589,664 | B2* | 3/2020 | Kashchenko | G06F 3/012 |
| 11,066,073 | B2* | 7/2021 | Ishioka | B60W 30/09 |
| 2008/0133136 | A1* | 6/2008 | Breed | G05D 1/0246 340/901 |
| 2009/0174540 | A1* | 7/2009 | Smith | B60Q 1/50 340/465 |
| 2020/0201334 | A1* | 6/2020 | Max | G08G 1/0112 |
| 2020/0307616 | A1* | 10/2020 | Nithiyanantham | G02B 27/0093 |
| 2022/0212597 | A1* | 7/2022 | Shiga | G05D 1/0055 |

FOREIGN PATENT DOCUMENTS

| | | |
|---|---|---|
| DE | 102004030951 A1 | 1/2006 |
| DE | 102006020631 A1 | 11/2007 |
| DE | 102009047436 A1 | 6/2011 |
| DE | 112012001775 T5 | 1/2014 |
| DE | 102013225138 A1 | 6/2015 |
| DE | 102015202826 A1 | 5/2016 |

OTHER PUBLICATIONS

Office Action created Dec. 6, 2022 in related/corresponding DE Application No. 10 2022 002 451.9.

* cited by examiner

METHOD FOR AUTOMATICALLY ACTUATING A DIRECTION INDICATOR AND VEHICLE

BACKGROUND AND SUMMARY OF THE INVENTION

Exemplary embodiments of the invention relate to a method for automatically actuating a direction indicator of an ego vehicle, as well as to a vehicle for performing the method.

In road traffic, vehicles travelling on a priority road that turns often indicate incorrectly. If a vehicle is on such a turning priority road and wishes to continue following it, it must indicate left or right at the respective crossroads in order to follow the priority road that turns. If the indicator is not turned on, then this actually signals that the vehicle will drive straight ahead at the crossroads.

At a corresponding crossroads with a priority road that turns, accidents may therefore occur more frequently. If a person driving an ego vehicle forgets to use an indicator when following a priority road that turns to the left, an oncoming third-party vehicle could assume that the ego vehicle will drive straight ahead. In this case, if a person driving the third-party vehicle intends to drive straight ahead, they might already start to move off. However, since the ego vehicle is following the priority road that turns to the left, a collision could then occur between the ego vehicle and the third-party vehicle.

In order to increase road traffic safety, there is thus a need to specify methods and devices with the aid of which a flashing indicator can be automatically activated when following a priority road that turns if the person driving the vehicle has forgotten to do so.

DE 10 2004 030 951 A1 discloses automatically activating a flashing indicator of a vehicle in accordance with a navigation route navigated by the vehicle. This implies the automatic activation of the flashing indicator when following a priority road that turns. Corresponding priority rules can be stored in digital map material, with the flashing indicator being activated when the navigation route follows the priority road that turns.

A similar method is also known from DE 10 2009 047 436 A1, in which the flashing indicator of a vehicle is able to be activated or deactivated by monitoring a vehicle position and comparing the vehicle position with digital map material. It is therefore possible to automatically activate or deactivate the flashing indicator without having to monitor that the vehicle is following a navigation route.

In addition, a control device for controlling a direction indicator of a motor vehicle is known from DE 10 2006 020 631 A1. A method executed by the control device for actuating the direction indicator provides that the direction indicator is activated in accordance with a predefined navigation route and at the same time taking into account sensor data that has been generated with a camera and a radar system. By taking the parameters mentioned into account, the direction indicator can be activated automatically, for example, when performing a lane change, when exiting a motorway, or when detecting that the vehicle is in a turning lane. If the respective traffic situation does not allow a respective traffic maneuver to be performed safely, for example because a road user following the vehicle is moving towards the vehicle at a significantly higher speed, then automatic actuation of the direction indicator can also be prevented.

Furthermore, DE 10 2013 225 138 A1 discloses automatic flashing indicator assistance. A control unit for a vehicle automatically deactivates a flashing indicator activated for a particular driving maneuver after the driving maneuver has ended.

In addition, DE 197 22 186 A1 discloses a method for detecting the right moment in time to automatically operate a direction indicator based on a route travelled by a vehicle, wherein the route is determined by means of a navigation system.

Such navigation system-controlled direction indication is also known from DE 11 2012 001 775 T5. In this case, a flashing indicator is automatically operated when the vehicle is in a turning zone that is stored in a digital road map.

Exemplary embodiments of the present invention are directed to an improved method for automatically actuating a direction indicator of an ego vehicle, the use of this method lowering the risk of accidents in the region of a crossroads with a priority road that turns.

In a method of the type mentioned in the introduction for automatically actuating a direction indicator of an ego vehicle in right-hand traffic, wherein the ego vehicle monitors its surroundings by means of a surroundings sensor system and determines its current location by means of a navigation unit and sensor data generated by the surroundings sensor system and the location determined by the navigation unit are processed by a computing unit, whereupon the computing unit actuates the direction indicator depending on information obtained from the processing of the sensor data and from a comparison of the location with a digital road map, wherein furthermore the computing unit is designed to detect that the ego vehicle is approaching a crossroads with a priority road that turns and to automatically activate the direction indicator when the crossroads is approached if a navigation route used by the navigation unit requires a turning maneuver to be performed at the crossroads, according to the invention, when the computing unit detects that the ego vehicle is on a priority path, the computing unit checks the sensor data to establish whether: in the event that a priority road turns to the right, a third-party vehicle can be detected in a street leading into the crossroads from the left or in a street lying ahead and opposite the ego vehicle from the perspective of the ego vehicle, when the navigation route of the ego vehicle follows the priority road that turns to the right; and/or in the event that a priority road turns to the left, a third-party vehicle can be detected in the street leading into the crossroads from the right from the perspective of the ego vehicle, when the navigation route of the ego vehicle follows the priority road that turns to the left; and/or in the event that a priority road turns to the left, a third-party vehicle can be detected in the street leading into the crossroads from the right or in the street lying ahead from the perspective of the ego vehicle, when the navigation route of the ego vehicle leads off to the right from priority road that turns; whereupon the computing unit actuates the direction indicator in order to activate the direction indicator when the computing unit, on checking sensor data, detects no third-party vehicle in the respective street, or to prevent activation of the direction indicator when the computing unit, on checking the sensor data, detects at least one third-party vehicle in the respective street.

By applying the method according to the invention, a critical traffic situation can be avoided in which there is a risk of an accident due to an incorrect setting of a direction indicator, such as a flashing indicator, in the region of a crossroads with a priority road that turns. For instance, it is possible, with the aid of a driver assistance system known from the prior art or a corresponding method for automatically actuating the direction indicator, to automatically activate the direction indicator of the ego vehicle so as to follow the navigation route along the priority road that turns. The Applicant has recognized, however, that there is a risk of an accident in certain traffic situations due to the automatic activation of the direction indicator. This is prevented with the method according to the invention.

It might be that the person driving the ego vehicle does not want to follow the navigation route used by the navigation unit, for example because the person driving the vehicle has local knowledge and deviating from the navigation route represents a short cut, or for example because they intend to make an interim stop away from the navigation route. It is immaterial in this case whether the navigation route follows the priority road that turns or the branch of the crossroads opposite the priority road that turns. In both cases, however, the navigation route goes either left or right at the crossroads, i.e., it goes into the street on the left or the street on the right. If a vehicle then wishes to enter the crossroads from the street opposite the priority road that turns, i.e., from the street to the left if the priority road turns to the right and from the street to the right if the priority road turns to the left, there is a risk of an accident if the ego vehicle automatically activates the direction indicator in accordance with the navigation route. There can also be a risk of an accident between the ego vehicle and an oncoming vehicle. This is explained hereinbelow for the example of a priority road turning to the left and a third-party vehicle entering the crossroads from the street on the right and applies correspondingly to the other use scenarios.

In a method known from the prior art for automatically operating the direction indicator in accordance with the navigation route, the direction indicator would be activated to indicate a turning maneuver to the left, since the computing unit would assume that the ego vehicle will turn left to follow the navigation route. Alternatively, the navigation route could also lead into the street on the right and so the ego vehicle indicates right. In both cases, a person driving the third-party vehicle could be prompted by the operation of the direction indicator of the ego vehicle to start to move off, even if the third-party vehicle has to give way, because there is no risk of an accident if the ego vehicle performs a turning maneuver to the left when the third-party vehicle, from their perspective, wishes to turn right, or were the ego vehicle, from their perspective, to turn right and the third-party vehicle, from their perspective, wishes to go straight on or turn right. If, however, the person driving the ego vehicle decides instead to drive straight across the crossroads, there is a risk of an accident with the third-party vehicle that is approaching or entering the crossroads.

By applying the method according to the invention, the computing unit checks, however, whether any third-party vehicles can be found in the respective opposite street of the crossroads that lies opposite the priority road that turns and in this case refrains from automatically operating the direction indicator. Should the person driving the ego vehicle then drive straight across the crossroads and deviate from the navigation route, the potential for an accident is reduced, as the person driving the third-party vehicle would recognize, as a result of the direction indicator of the ego vehicle not being operated, that the ego vehicle is driving straight ahead. Therefore, the person driving the third-party vehicle would not move off as well.

By contrast, if there is no third-party vehicle in the respective street, the direction indicator of the ego vehicle can be safely automatically activated.

The surroundings sensor system of the ego vehicle can use a wide variety of environment sensors. These include monocular cameras or stereo cameras, radar sensors, laser scanners such as a LIDAR, ultrasound sensors, and the like. Such systems can be used to extensively monitor the surroundings of the vehicle. This allows other road users to be reliably detected, such as the third-party vehicle.

The sensor data generated by means of the surroundings sensor system can also be used to analyze the plausibility of a relevant traffic situation. For example, tried and tested image recognition algorithms can be used to recognize traffic signs in camera images, which suggest that the ego vehicle is arriving at a crossroads with priority that turns. The computing unit can then optionally also deduce from the traffic sign on which street of the crossroads it is located, i.e., a street of the priority road or a street on which road users have to give way.

The navigation unit can be a vehicle-integrated or also a mobile navigation system. Determining the position of the ego vehicle is possible with the aid of global navigation satellite systems such as GPS, Galileo, Beidou, or the like. The navigation unit can comprise a data memory with said digital road maps. Priority rules and priority roads that turn accordingly can be saved in the digital road map.

One advantageous refinement of the method provides that a control signal output by the computing unit for actuating the direction indicator is overridden by the manual operation of a direction indicator operator control element. The direction indicator operator control element can be, for example, a flashing indicator lever. In a situation in which a third-party vehicle is detected in the respective street, according to the above embodiment, the direction indicator of the ego vehicle is not automatically activated. However, should the person driving the ego vehicle actually want to make a turn, for example in order to follow the navigation route after all, then the direction indicator of the ego vehicle can be activated manually. This allows a situation to be avoided in which no corresponding direction indication is given, even though the ego vehicle is performing a turning maneuver. If the priority road turns to the left and the navigation route also goes to the left, the person driving the ego vehicle can also indicate right if they intend to turn right, whereby a third-party vehicle in the street to the right can recognize that it is safe to move off. The corresponding traffic situations can be transferred analogously to the respectively mirrored priority situation.

In accordance with a further advantageous configuration of the method, when the midpoint of the crossroads is crossed, the computing unit actuates the direction indicator in order to:
  activate an inactive direction indicator when the computing unit detects that the ego vehicle is turning at the crossroads; or
  deactivate an active direction indicator when the computing unit detects that the ego vehicle is driving straight ahead through the crossroads.

After crossing the midpoint of the crossroads, it is established with certainty which street the ego vehicle is entering. The computing unit can detect when the midpoint of the crossroads is crossed, for example by analyzing the location of the ego vehicle, i.e., the vehicle position, determined for example with the aid of the navigation unit. The sensor data generated by the surroundings sensor system can also analyzed in addition or as an alternative to this. For example, the computing unit can also detect from camera images whether the midpoint of the crossroads has been crossed. Analogously, the computing unit can detect the turning maneuver or the straight-ahead travel. Dynamic driving data can also be used for this purpose, such as a steering angle, lateral and/or longitudinal acceleration values, a forward travel speed and the like. Relevant data can be conveyed to the computing unit from a driver assistance system, for example an ESP.

This improves the comfort for the person driving the ego vehicle even further, since after crossing the midpoint of the crossroads, the direction indicator of the ego vehicle can be automatically operated in accordance with the traffic maneuver actually performed. If, for example, the automatic activation of the direction indicator was dispensed with because a third-party vehicle was detected in the corresponding street, the direction indicator can nevertheless be automatically activated after crossing the midpoint of the crossroads.

If, conversely, there is no third-party vehicle in the corresponding street, the direction indicator is automatically operated anyway for following the navigation route. If the ego vehicle drives straight ahead across the crossroads, the direction of travel would be incorrectly indicated. In such a case, the straight-ahead travel can be detected and the incorrectly activated direction indicator switched off again.

A further advantageous configuration of the method furthermore provides that the computing unit captures a gaze direction of the person driving the ego vehicle with the aid of at least one vehicle interior sensor and the computing unit actuates the direction indicator, wherein a control signal previously output by the computing unit is overridden in order to:
- activate an inactive direction indicator when the computing unit detects that, when the ego vehicle enters the crossroads, the gaze direction is directed towards the street on the left or the street on the right; or
- deactivate an active direction indicator when the computing unit detects that, when the ego vehicle enters the crossroads, the gaze direction is directed straight ahead onto a street lying ahead from the perspective of the ego vehicle.

This also increases the comfort for the person driving the ego vehicle. It is possible to automatically activate and deactivate the direction indicator in accordance with traffic regulations and based on a wide variety of traffic situations. The person driving the ego vehicle then no longer has to accordingly manually operate the direction indicator operator control element, for example the flashing indicator lever, to correct an incorrectly indicated direction of travel. In this way, the computing unit detects the planned driving trajectory of the person driving the vehicle from their gaze direction and activates or deactivates the direction indicator accordingly.

Overriding the control signals originally output by the computing unit in order to actuate the direction indicator in accordance with the manual operation of the direction indicator operator control element, crossing the midpoint of the crossroads and monitoring the gaze direction of the person driving the vehicle can be combined in any order and manner. For example, manually operating the direction indicator operator control element can override the automatic actuation of the direction indicator when crossing the midpoint of the crossroads and depending on the captured gaze direction. Depending on the configuration, crossing the midpoint of the crossroads or the actuation depending on the gaze direction of the person driving the vehicle can also be used as the main actuation option.

In a vehicle comprising a direction indicator, a surroundings sensor system, a navigation unit and a computing unit, according to the invention the direction indicator, the surroundings sensor system, the navigation unit, and the computing unit are configured to carry out a method described hereinabove. The vehicle can be any vehicle, such as a car, lorry, van, bus, or the like. The direction indicator is embodied in particular as a flashing indicator. The direction indicator is referred to in the singular; however it actually represents a suitable number of direction indication means. For example, the vehicle can have flashing indicators at the rear and front of the vehicle, as well as on the sides, integrated into wing mirrors, for example. By operating flashing indicators installed on the left-hand half of the vehicle, a planned turning maneuver to the left in the direction of travel of the ego vehicle can be indicated in advance and a turning maneuver to the right can be indicated correspondingly by means of the flashing indicators disposed on the right-hand half of the vehicle.

To create the surroundings sensor system, the vehicle can comprise various monocular cameras, stereo cameras, radar sensors, ultrasound sensors, and/or also laser scanners such as one or a plurality of LIDARs comprise. The navigation unit can be embodied in particular as a navigation system that is permanently integrated in the vehicle. The computing unit analyses the sensor data provided by the surroundings sensor system and analyzes information conveyed by the navigation unit, such as a planned navigation route and an actual location of the ego vehicle, in particular by taking a comparison with a digital road map into account. Depending on the parameters mentioned, the computing unit then controls the direction indicator. The third-party vehicle can analogously be a car, lorry, van, bus, but also a small vehicle such as an e-scooter, a bicycle, a pedelec, or even a motorcycle or the like.

Further advantageous configurations of the method according to the invention for automatically actuating the direction indicator of the ego vehicle become apparent from the exemplary embodiments, which are described in detail hereinbelow with reference to the figures.

BRIEF DESCRIPTION OF THE DRAWING FIGURES

Figure 2:
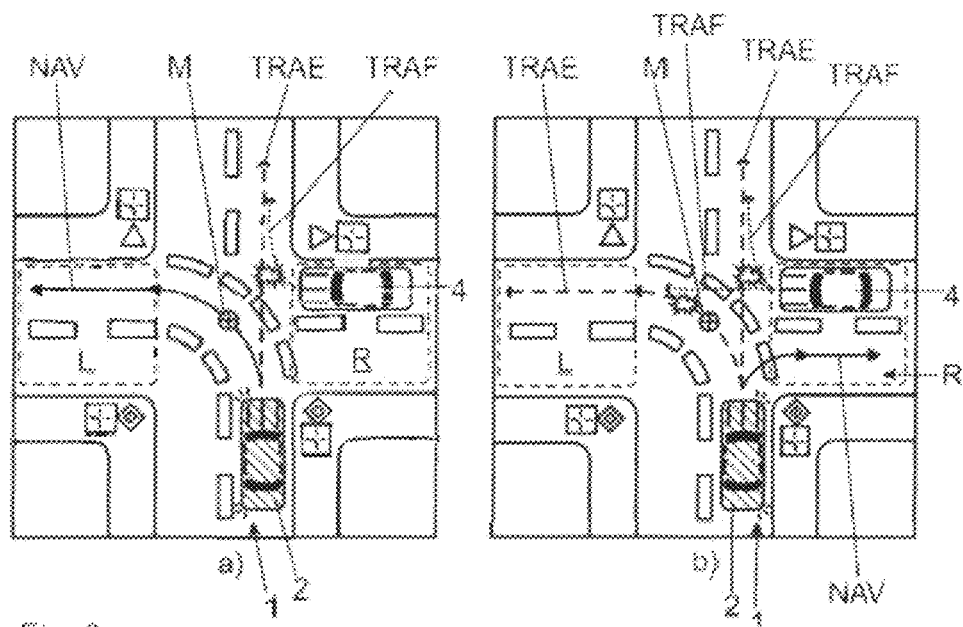
Figure 3:
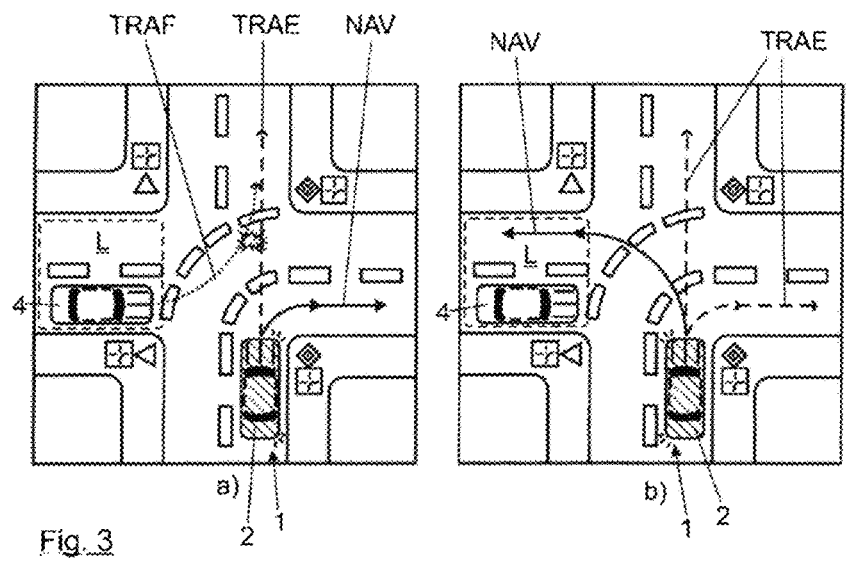
Figure 4:
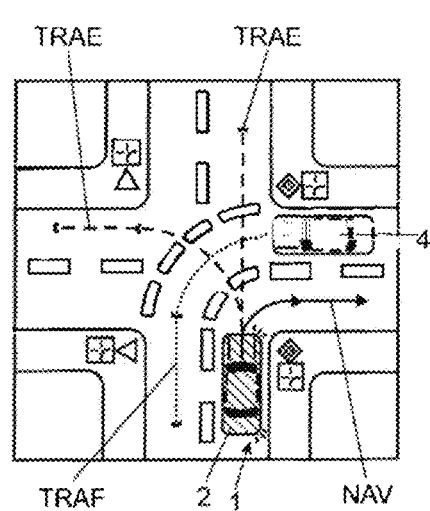
Figure 5:
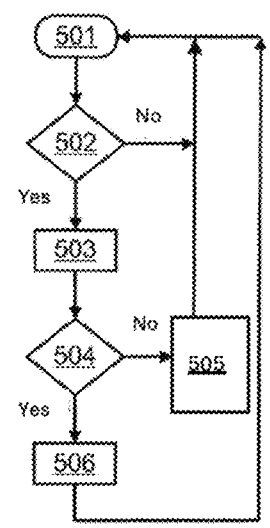

The figures show:

FIG. 1 a schematic plan view of a crossroads with turning priority, in which an ego vehicle exhibits rule-abiding driving behavior in two different traffic situations;

FIG. 2 a schematic plan view of two traffic situations with an increased risk of an accident at a crossroads with priority turning to the left;

FIG. 3 a schematic plan view of two traffic situations at a crossroads with priority turning to the right, wherein one of the traffic situations has an increased risk of an accident;

FIG. 4 a schematic plan view of a third, equally safe traffic situation at a crossroads with priority turning to the right; and FIG. 5 a flowchart of a method according to the invention.

DETAILED DESCRIPTION

FIG. 1 shows a plan view of a crossroads 3 in two traffic situations, which are illustrated by the letters a) and b). In the illustration, an ego vehicle 2 approaches the crossroads 3, with the ego vehicle 2 driving straight ahead across the crossroads 3 in situation a) and turning to the left in situation b) to follow the priority road that turns.

Driving rules means that in situation a), a direction indicator 1, for example a flashing indicator of the ego vehicle 2, is not operated to indicate driving straight-ahead. Accordingly, in driving situation b), the direction indicator 1 of the ego vehicle 2 needs to be operated to indicate the turning maneuver to the left. In other words, the left indicator of the ego vehicle 2 must be activated.

The importance of operating the direction indicator 1 correctly can be seen from FIG. 1. If the driving situation shown in FIG. 1*b*) occurs and the direction indicator 1 of the ego vehicle 2 is not operated, a third-party vehicle 4 coming towards the ego vehicle 2 in the opposite direction from a street V lying ahead could incorrectly assume that the ego vehicle 2 also wants to drive straight ahead across the crossroads 3. In that case, the third-party vehicle 4 could move off because there is no risk of an accident. Since, however, the ego vehicle 2 is turning left, the ego vehicle 2 and the third-party vehicle 4 could collide.

With the aid of driver assistance systems or methods for actuating direction indicators 1 that are known from the prior art, it is possible to analyze a navigation route of the ego vehicle 2 and thereby detect which path the ego vehicle 2 is likely to select in the region of a crossroads 3 with a priority road that turns. The direction indicator 1 can accordingly be operated automatically.

The Applicant has recognized, however, that traffic situations can arise in which such an automatic operation of the direction indicator 1 initially leads to a potential accident. In this case, a method according to the invention for automatically actuating the direction indicator 1 comes into play in order to avoid such accidents.

The corresponding traffic situations are explained based on the following figures. For instance, FIG. 2 shows a plan view of a crossroads 3 with a priority road that turns to the left from the perspective of the ego vehicle 2. Here, FIG. 2*a*) shows the situation where a navigation route NAV of the ego vehicle 2 follows the priority road that turns and FIG. 2*b*) shows the situation where the navigation route NAV turns right.

It might be that the person driving the ego vehicle 2 does not want to follow the navigation route NAV, for example because the person driving the vehicle has local knowledge and knows that another corresponding route represents a short cut, or because they intend to make an interim stop away from the navigation route NAV. The ego vehicle 2 could therefore select the route shown by a dashed line or a corresponding trajectory TRAE.

If a third-party vehicle 4 also wants to enter the crossroads 3, from a street R to the right from the perspective of the ego vehicle 2, there could be a risk of an accident. Specifically, if the direction indicator 1 is activated automatically in accordance with the navigation route NAV, the flashing indicator of the ego vehicle 2 would indicate left in FIG. 2*a*) and right in FIG. 2*b*). The person driving the third-party vehicle 4 would then assume that the ego vehicle 2 is following the respective navigation route NAV. In FIG. 2*a*), the two vehicles 2 and 4 could turn in front of each other, which would allow both vehicles 2 and 4 to quickly and safely pass through the crossroads 3 at the same time. In FIG. 2*b*), the third-party vehicle 4 could simply drive off, since the ego vehicle 2 would not intersect a trajectory TRAF of the third-party vehicle 4.

If, by contrast, the ego vehicle 2 follows the actual trajectory TRAE instead of the navigation route NAV, there is risk of an accident with the third-party vehicle 4, highlighted by the jagged outline.

By contrast, the method according to the invention provides that the ego vehicle 2 monitors its surroundings using a surroundings sensor system, whereby the third-party vehicle 4 is detected in the street R to the right. In this case, automatic actuation of the direction indicator 1 is prevented so as not to prompt the person driving the third-party vehicle 4 to move off. Therefore, there is no risk of an accident when the ego vehicle 2 follows the trajectory TRAE instead of the navigation route NAV.

Nevertheless, should the person driving the ego vehicle 2 wish to follow the navigation route NAV, the person driving the vehicle can also manually activate the flashing indicator, which overrides the control command of a computing unit of the ego vehicle 2 to prevent automatic activation of the direction indicator 1. Similarly, the flashing indicator of the ego vehicle 2 can be automatically activated when the ego vehicle 2 detects that a midpoint M in the crossroads 3 has been passed. To this end, the ego vehicle 2 does not have to have driven directly over the midpoint M, but merely traversed the corresponding section of the navigation route NAV that is closest to the midpoint M. A gaze direction of the person driving the ego vehicle 2 can also be tracked, whereby the computing unit of the ego vehicle 2 can automatically activate the flashing indicator when the person driving the vehicle glances towards the corresponding street R on the right or towards a street L on the left from the perspective of the ego vehicle 2.

There is also a risk of an accident in FIG. 2*b*) if a third-party vehicle wants to enter the crossroads 3 from the street V lying ahead (not shown), when the ego vehicle 2 is actually turning left. Thanks to the method according to the invention, such a potential accident can be avoided.

FIG. 3 shows an analogous traffic situation for a crossroads 3 with a priority road that turns to the right. Here as well, the traffic situation indicated using the reference sign a) shows the case where the navigation route NAV follows the priority road that turns and the traffic situation b) shows the situation where the navigation route NAV leads into the street opposite the priority road that turns. If, in FIG. 3*a*), there is a third-party vehicle 4 in the street L to the left, the vehicle could be prompted to enter the crossroads 3 when the ego vehicle 2 automatically indicates to the right to follow a navigation route NAV. If, however, the ego vehicle 2 is driving along the trajectory TRAE, there is a risk of an accident here as well. The method according to the invention can be transferred to the traffic situation shown in FIG. 3*a*), so that here as well, automatic activation of the direction indicator 1 can be prevented. The potential for an accident can therefore be reduced in this case as well.

There is also the risk of an accident in FIG. 3*a*) if a third-party vehicle wants to enter the crossroads 3 from the street V lying ahead (not shown), when the ego vehicle 2 is actually turning left. Thanks to the method according to the invention, such a potential accident can also be avoided.

In FIG. 3*b*), by contrast, there is no risk of an accident, since the third-party vehicle 4 must always give way to the ego vehicle 2. Therefore, the traffic situation shown in FIG. 3*b*) can also be omitted when performing the method according to the invention. Even if the third-party vehicle 4 is detected in the street L to the left, it is safe to automatically activate the direction indicator 1 to indicate left, even if the ego vehicle 2 were actually to follow the trajectory TRAE. The computing unit of the ego vehicle is accordingly configured to detect a respective traffic situation.

FIG. 4 shows another traffic situation, in which automatically operating the direction indicator 1 does not pose any danger. This is because, in this case, the ego vehicle 2 would have to give way to the third-party vehicle 4 before navigating one of the trajectories TRAE. Accordingly, there is no risk of an accident caused by the automatic operation of the direction indicator 1 because the person driving the ego vehicle 2 first has to stop and let the third-party vehicle 4 pass.

FIG. 5 shows a flowchart of the method according to the invention.

In a method step 501, navigation guidance for the ego vehicle 2 using a navigation unit is started. The navigation unit then determines said navigation route NAV.

In a method step 502, the computing unit of the ego vehicle 2 checks whether a turning maneuver is envisaged at a priority road that turns. If the corresponding crossroads 3 is reached, then the surroundings of the ego vehicle 2 are monitored by means of a surroundings sensor in method step 503. The computing unit then checks in a method step 504 whether a third-party vehicle 4 can be found in the respective street opposite from the priority road that turns. If no third-party vehicle 4 can be found, then the direction indicator 1 can be automatically activated in a method step 505. If, by contrast, such a third-party vehicle 4 is detected, then automatic operation of the direction indicator 1 is omitted in a method step 506.

The existence of further vehicles in the region of the crossroads 3 has no influence on the implementation of the method according to the invention.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for automatically actuating a direction indicator of an ego vehicle in right-hand traffic, the method comprising:
   monitoring, by the ego vehicle using surroundings sensor system, surroundings of the ego vehicle to generate sensor data;
   determining, by the ego vehicle using a navigation unit, a current location of the ego vehicle;
   processing, by a computing unit of the ego vehicle, the sensor data and the current location;
   detecting, by the computing unit, that the ego vehicle is approaching a crossroads with a priority road that turns, wherein the computing unit is configured to automatically activate the direction indicator when the crossroads is approached when a navigation route used by the navigation unit requires a turning maneuver to be performed at the crossroads; and
   controlling, by the computing unit, actuation of the direction indicator depending on information obtained from the processing of the sensor data and from a comparison of the current location with a digital road map,
   wherein when the computing unit detects the ego vehicle is located on the priority road, the computing unit checks the sensor data to establish whether
      in an event the priority road turns to right, a third-party vehicle can be detected in a street leading into the crossroads from left or in a street lying ahead and opposite the ego vehicle from a perspective of the ego vehicle, when the navigation route of the ego vehicle follows the priority road that turns to the right,
      in an event that a priority road turns to the left, the third-party vehicle can be detected in a street leading into the crossroads from the right from the perspective of the ego vehicle, when the navigation route of the ego vehicle follows the priority road that turns to the left, or
      in an event that a priority road turns to the left, the third-party vehicle can be detected in a street leading into the crossroads from the right or in the street lying ahead from the perspective of the ego vehicle, when the navigation route of the ego vehicle leads off to the right from the priority road that turns,
   wherein, based on the computing unit checking the sensor data, the computing unit actuates the direction indicator, in order to
      activate the direction indicator when the computing unit, on checking the sensor data, detects no third-party vehicle in the respective street, and
      prevent activation of the direction indicator when the computing unit, on checking the sensor data, detects at least one third-party vehicle in the respective street.

2. The method of claim 1, wherein a control signal output by the computing unit for actuating the direction indicator is overridden by manual operation of a direction indicator operator control element.

3. The method of claim 1, wherein when a midpoint of the crossroads is crossed, the computing unit actuates the direction indicator in order to:
   activate an inactive direction indicator when the computing unit detects that the ego vehicle is turning at the crossroads, or
   deactivate an active direction indicator when the computing unit detects that the ego vehicle is driving straight ahead through the crossroads.

4. The method of claim 1, wherein the computing unit captures a gaze direction of a person driving the ego vehicle using at least one vehicle interior sensor and the computing unit actuates the direction indicator, wherein a control signal previously output by the computing unit is overridden in order to:
   activate an inactive direction indicator when the computing unit detects that, when the ego vehicle enters the crossroads, the gaze direction is directed towards the street on the left or the street on the right, or
   deactivate an active direction indicator when the computing unit detects that, when the ego vehicle enters the crossroads, the gaze direction is directed straight ahead onto a street lying ahead from the perspective of the ego vehicle.

5. An ego vehicle comprising:
   a direction indicator;
   a surroundings sensor system;
   a navigation unit; and
   a computing unit, wherein
the surroundings sensor system, the navigation unit and the computing unit are configured to automatically actuate a direction indicator of the ego vehicle in right-hand traffic,
the surroundings sensor system is configured to monitor surroundings of the ego vehicle to generate sensor data,
the navigation unit is configured to determined a current location of the ego vehicle,
the computing unit is configured to process the sensor data and the current location,
the computing unit is configured to detect that the ego vehicle is approaching a crossroads with a priority road that turns,
the computing unit is configured to automatically activate the direction indicator when the crossroads is approached when a navigation route used by the navigation unit requires a turning maneuver to be performed at the crossroads,
the computing unit, is configured to control actuation of the direction indicator depending on information obtained from the processing of the sensor data and from a comparison of the current location with a digital road map,
wherein, when the computing unit detects the ego vehicle is located on the priority road, the computing unit is configured to check the sensor data to establish whether
in an event the priority road turns to right, a third-party vehicle can be detected in a street leading into the crossroads from left or in a street lying ahead and opposite the ego vehicle from a perspective of the ego vehicle, when the navigation route of the ego vehicle follows the priority road that turns to the right,
in an event that a priority road turns to the left, the third-party vehicle can be detected in a street leading into the crossroads from the right from the perspective of the ego vehicle, when the navigation route of the ego vehicle follows the priority road that turns to the left, or
in an event that a priority road turns to the left, the third-party vehicle can be detected in a street leading into the crossroads from the right or in the street lying ahead from the perspective of the ego vehicle, when the navigation route of the ego vehicle leads off to the right from the priority road that turns,
wherein, based on the computing unit checking the sensor data, the computing unit is configured to actuate the direction indicator, in order to
activate the direction indicator when the computing unit, on checking the sensor data, detects no third-party vehicle in the respective street, and prevent activation of the direction indicator when the computing unit, on checking the sensor data, detects at least one third-party vehicle in the respective street.

* * * * *